US012631896B2

(12) United States Patent
Koito

(10) Patent No.: US 12,631,896 B2
(45) Date of Patent: *May 19, 2026

(54) LIQUID CRYSTAL DISPLAY DEVICE AND DISPLAY DEVICE

(71) Applicant: Magnolia White Corporation, Tokyo (JP)

(72) Inventor: Takeo Koito, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/738,134

(22) Filed: Jun. 10, 2024

(65) Prior Publication Data

US 2024/0329424 A1    Oct. 3, 2024

Related U.S. Application Data

(63) Continuation of application No. 17/705,917, filed on Mar. 28, 2022, now Pat. No. 12,007,588.

(30) Foreign Application Priority Data

Mar. 31, 2021    (JP) ................................. 2021-062043

(51) Int. Cl.
*G02B 30/31*        (2020.01)
*G02B 30/32*        (2020.01)
*G02F 1/29*        (2006.01)

(52) U.S. Cl.
CPC ............. *G02B 30/31* (2020.01); *G02B 30/32* (2020.01); *G02F 1/29* (2013.01)

(58) Field of Classification Search
CPC ........ G02B 30/30; G02B 30/31; G02B 30/32; G02F 1/29
See application file for complete search history.

(56) References Cited

U.S. PATENT DOCUMENTS

| | | | |
|---|---|---|---|
| 12,007,588 B2 * | 6/2024 | Koito | ..................... G02B 30/31 |
| 2009/0015738 A1 | 1/2009 | Hong et al. | |
| 2009/0225243 A1 | 9/2009 | Kim et al. | |
| 2013/0208195 A1 | 8/2013 | Cho et al. | |

(Continued)

FOREIGN PATENT DOCUMENTS

JP        4885300 B2    2/2012

*Primary Examiner* — Alexander P Gross
(74) *Attorney, Agent, or Firm* — K&L Gates LLP

(57)        ABSTRACT

According to an aspect, a liquid crystal display device includes: a first panel configured to display an image; a backlight configured to irradiate the first panel with light; and a second panel configured to limit an emission area of the light. The second panel includes a plurality of first electrodes whose potentials are individually controllable and a second electrode provided at a position opposite to the first electrodes with liquid crystal between the first and second electrodes. The first electrodes are arranged in a first direction along the second panel. The first electrodes are provided with such a potential that liquid crystal in a first state and liquid crystal in a second state alternately occur in the first direction. The first state is a state of blocking light. The second state is a state of transmitting light and changing refractive index distribution of light incident from the backlight side.

14 Claims, 12 Drawing Sheets

(56)                    References Cited

U.S. PATENT DOCUMENTS

2014/0009705 A1*  1/2014  Inoue ..................... G02B 30/27
                                                                  349/61
2014/0125934 A1   5/2014  Naganuma et al.
2015/0070607 A1   3/2015  Usukura et al.
2016/0048029 A1*  2/2016  An ...................... H04N 13/356
                                                                  349/33
2017/0048515 A1   2/2017  Imai et al.
2019/0072774 A1   3/2019  Jin et al.

* cited by examiner

LIQUID CRYSTAL DISPLAY DEVICE AND DISPLAY DEVICE

CROSS-REFERENCE TO RELATED APPLICATION

The present application is a continuation of U.S. application Ser. No. 17/705,917, filed on Mar. 28, 2022, which claims priority from Japanese Patent Application No. 2021-062043 filed on Mar. 31, 2021, the entire contents of which are incorporated herein by reference.

BACKGROUND

1. Technical Field

What is disclosed herein relates to a liquid crystal display device and a display device.

2. Description of the Related Art

A display device configured to generate a stereoscopic view by outputting a parallax image has been known. As described in Japanese Patent No. 4885300, a method of employing a parallax barrier by using a lens has been known as a parallax-image formation method.

However, a lenticular element disclosed in Japanese U.S. Pat. No. 4,885,300 is what is called a physical lens, and a two-dimensional (2D) view (image planar view) and a three-dimensional (3D) view (image stereoscopic view) cannot be switched therebetween in a display device including the lenticular element. In place of the physical lens, a liquid crystal panel having a lens function can be provided on a display panel and turned on and off to switch between the 2D view and the 3D view.

A display device on which not only a simple stereoscopic view with two viewpoints but also a stereoscopic image with multiple viewpoints such as three or more viewpoints can be recognized, needs to ensure optical properties including luminance at each viewpoint. When the above-described liquid crystal panel is caused to simply function as a liquid crystal lens, it is not possible to ensure a phase difference if the optical properties are to be ensured at each viewpoint. Therefore, it is difficult to obtain sufficient optical properties at each viewpoint. Although the phase difference can be ensured by increasing the thickness of the liquid crystal layer, light scatters in the liquid crystal layer and the optical properties degrade when the thickness of the layer is equal to or greater than a predetermined thickness. Thus, it has been difficult to sufficiently ensure the optical properties at each of the above-described multiple viewpoints only by simply replacing a conventional physical lens with a liquid crystal lens.

For the foregoing reasons, there is a need for a liquid crystal display device and a display device that are capable of forming a parallax barrier by a liquid crystal panel and ensuring optical properties at each viewpoint.

SUMMARY

According to an aspect, a liquid crystal display device includes: a first panel configured to display an image by using light from a back surface side; a backlight configured to irradiate the first panel with light from the back surface side; and a second panel configured to limit an emission area of the light so that the image output from the first panel is visually recognized as a parallax image. The second panel includes a plurality of first electrodes whose potentials are individually controllable and a second electrode provided at a position opposite to the first electrodes with liquid crystal interposed between the first and second electrodes. The first electrodes are arranged in a first direction along the second panel. The first electrodes are provided with such a potential that liquid crystal in a first state and liquid crystal in a second state alternately occur in the first direction. The first state is a state of blocking light. The second state is a state of transmitting light and changing refractive index distribution of light incident from the backlight side.

DETAILED DESCRIPTION

An embodiment of this disclosure is described below with reference to the drawings. The disclosure is only an example, and any changes that can be easily conceived by those skilled in the art while maintaining the main purpose of the invention are naturally included in the scope of the disclosure. The drawings may be schematically represented in terms of the width, thickness, shape, etc. of each part compared to those in the actual form for the purpose of clearer explanation, but they are only examples and do not limit the interpretation of this disclosure. In the present specification and the drawings, the same reference sign is applied to the same elements as those already described for the previously mentioned drawings, and detailed explanations may be omitted as appropriate.

Mechanism of Stereoscopic View

Before describing the embodiment, the mechanism of a display device configured to generate a stereoscopic view will be described below with reference to FIGS. 1 and 2.

Figure 1:
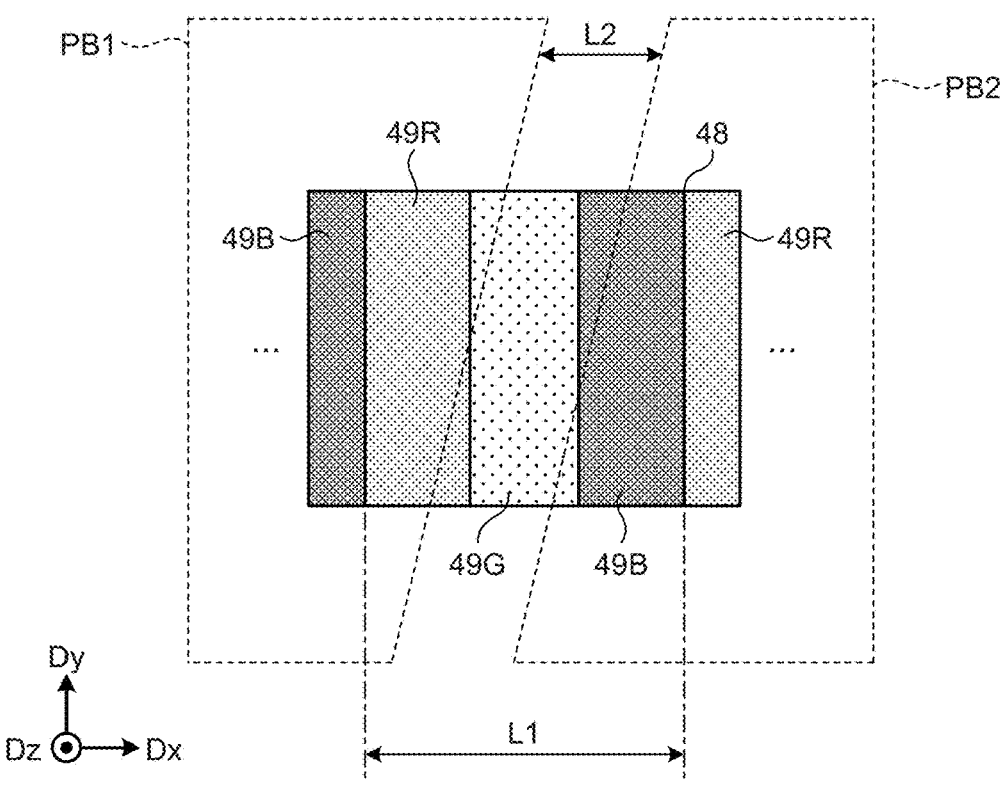
FIG. 1 is a schematic diagram illustrating the mechanism of a display device configured to generate a stereoscopic view.

FIG. 1 is a schematic diagram illustrating the mechanism of the display device configured to generate a stereoscopic view. FIG. 2 is a schematic diagram illustrating optical axes R1, R2, . . . , Rn of light from a first panel 40 to a plurality of viewpoints E1, E2, . . . , En.

Figure 2:
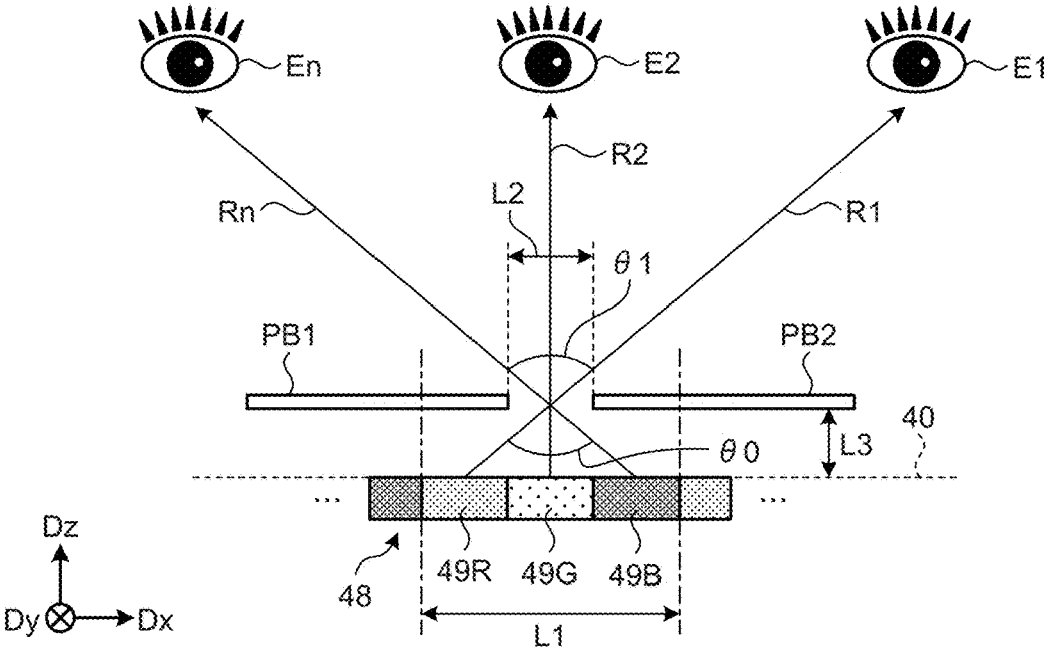
FIG. 2 is a schematic diagram illustrating optical axes of light from a first panel to a plurality of viewpoints.

A pixel 48 illustrated in FIGS. 1 and 2 includes a first sub pixel 49R, a second sub pixel 49G, and a third sub pixel 49B. Hereinafter, the first sub pixel 49R, the second sub pixel 49G, and the third sub pixel 49B are collectively referred to as sub pixels 49. A plurality of the pixels 48 are provided in the first panel 40. The first panel 40 displays and outputs an image by controlling the luminance of the sub pixels 49 included in each of the pixels 48. Hereinafter, two directions along an image display surface of the first panel 40 provided with the pixels 48 are referred to as a first direction Dx and a second direction Dy. The first direction Dx is orthogonal to the second direction Dy. In addition, a direction orthogonal to the first direction Dx and the second direction Dy is referred to as a third direction Dz.

In, for example, FIG. 1, what is called a stripe color pixel is exemplarily illustrated as the pixel 48 having a rectangular shape in which the sub pixels 49 are arranged in the order of the first sub pixel 49R, the second sub pixel 49G, and the third sub pixel 49B from one side toward the other side in the first direction Dx, but the arrangement and shapes of the sub pixels 49 included in the pixel 48 are not limited thereto and can be changed as appropriate. In FIG. 1 and other figures, the pixel 48 achieves color display output as the first sub pixel 49R outputs light in red (R), the second sub pixel 49G outputs light in green (G), and the third sub pixel 49B outputs light in blue (B), but the combination and number of colors of the sub pixels 49 included in the pixel 48 are not limited thereto and can be changed as appropriate.

A parallax barrier is formed between the first panel 40 and each of the viewpoints E1, E2, . . . , En of a user who recognizes an image by visually recognizing light from the first panel 40. The parallax barrier includes, for example, a light-blocking region PB1, a light-blocking region PB2, and an opening part formed between the light-blocking region PB1 and the light-blocking region PB2 as illustrated in FIGS. 1 and 2. In FIGS. 1 and 2, the opening width of the opening part in the first direction Dx is indicated as a width L2.

The light-blocking regions PB1 and PB2 block light between the first panel 40 and each of the viewpoints E1, E2, . . . , En. Thus, among light from the first panel 40 toward the viewpoints E1, E2, . . . , En, light having an optical axis on which the light-blocking region PB1 or the light-blocking region PB2 is positioned is blocked and not visually recognized by the user.

FIG. 2 schematically illustrates the optical axes R1, R2, . . . , Rn of light from the first panel 40 toward the viewpoints E1, E2, . . . , En through the opening part of the parallax barrier. The optical axis R1 is the optical axis of light from the first sub pixel 49R toward the viewpoint E1. The optical axis R2 is the optical axis of light from the second sub pixel 49G toward the viewpoint E2. The optical axis Rn is the optical axis of light from the third sub pixel 49B toward the viewpoint En. Two of the viewpoints E1, E2, . . . , En are viewpoints of the two eyes of the user (human). In this manner, a stereoscopic view is formed by the optical axes R1, R2, . . . , Rn of light from each of the sub pixels 49 toward the different viewpoints E1, E2, . . . , En. The user can visually recognize different stereoscopic-view images from different viewpoints by changing its relative position with respect to the first panel 40 and the parallax barrier.

The number (n) of the optical axes R1, R2, . . . , Rn is any natural number. A stereoscopic view is formed with a larger number of the viewpoints E1, E2, . . . , En as the number n is larger.

An incident angle range $\theta 0$ of light entering the opening part of the parallax barrier and an emission angle range $\theta 1$ of light traveling from the first panel 40 toward the viewpoints E1, E2, . . . . En through the opening part of the parallax barrier depend on the width L2 and an interval L3 between the first panel 40 and the parallax barrier. An emission area L1 of the first panel 40 in which light can be emitted through one opening part of the parallax barrier is determined depending on the emission angle range $\theta 1$. The emission area L1 indicates a width in the first direction Dx. The width of the emission area L1 in the first direction Dx is greater than the width L2.

Embodiment

The embodiment of the present disclosure will be described below.

Figure 3:
FIG. 3 is a diagram illustrating an exemplary main configuration of a liquid crystal display device.
Figure 3:
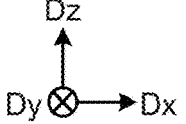

FIG. 3 is a diagram illustrating an exemplary main configuration of a liquid crystal display device 1. The liquid crystal display device 1 includes a backlight 70, a first polarization plate 81, the first panel 40, a second polarization plate 82, a bonding layer 91, a second panel 10, and a third polarization plate 83, which are stacked from one side toward the other side in the third direction Dz. The third polarization plate 83 is positioned on a user side closer to a user who recognizes a stereoscopic view, and the backlight 70 is positioned on a side (back surface side) opposite to the user side.

The backlight 70 irradiates the first panel 40 with light from the back surface side. The backlight 70 includes, for example, a plurality of light-emitting elements configured to emit white light. The light-emitting elements are, for example, white light-emitting diodes but not limited thereto and may be any light sources configured to function in a similar manner.

The pixels 48 described with reference to FIGS. 1 and 2 are arranged in the first panel 40. In FIG. 3, a region in which the pixels 48 are arranged and an image can be displayed and output is indicated as a display region AA. Although FIG. 3 illustrates the display region AA such that the display region AA indicates a width in the first direction Dx, the display region AA is a two-dimensional region along a plane orthogonal to the third direction Dz (refer to FIG. 8).

Figure 4:
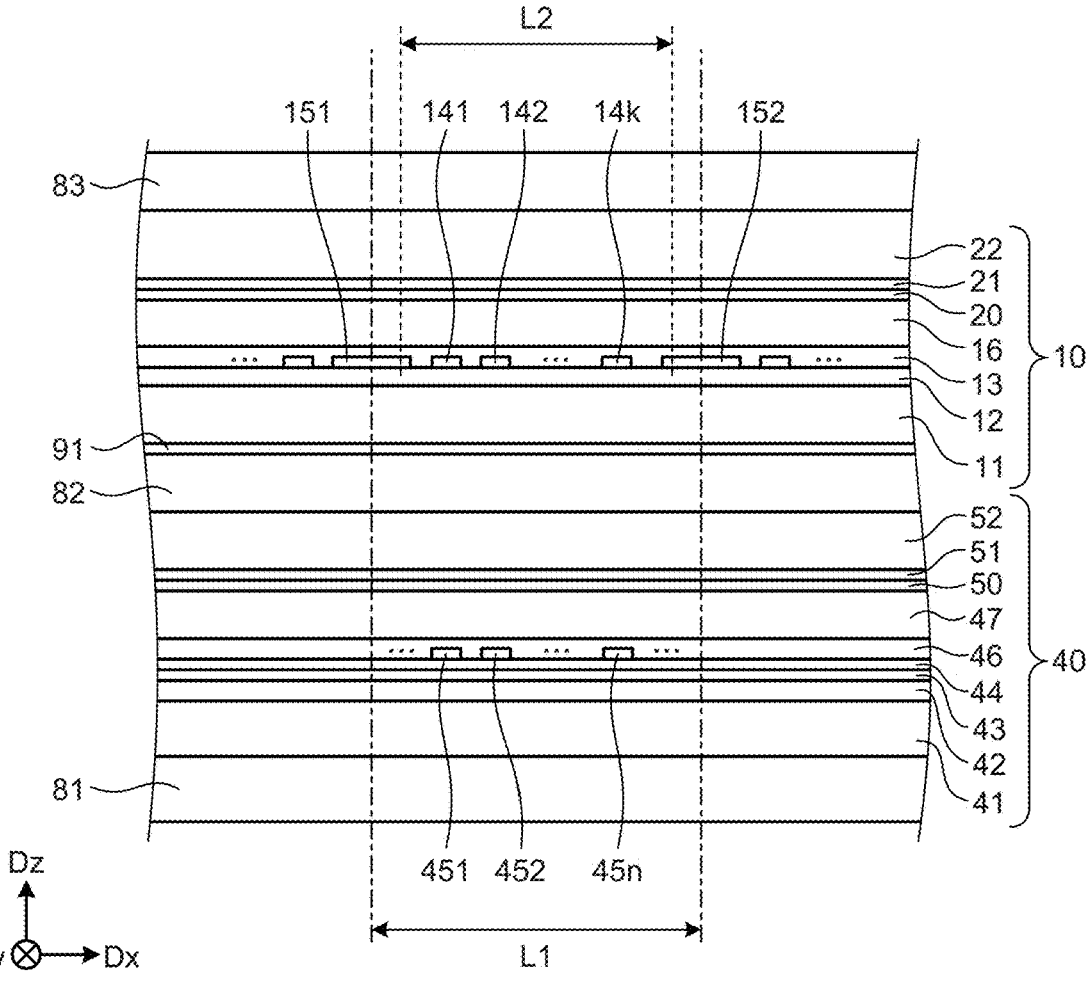
FIG. 4 is a schematic cross-sectional view illustrating the configuration of the liquid crystal display device included in the width of one opening part described with reference to FIGS. 1 and 2 and in an emission area including a sub pixel provided to be able to emit light to a user side through the opening part.

FIG. 4 is a schematic cross-sectional view illustrating the configuration of the liquid crystal display device 1 included in the width L2 of one opening part described with reference to FIGS. 1 and 2 and in the emission area L1 in which the sub pixels 49 provided to be able to emit light to the user side through the opening part are arranged. FIG. 4 omits illustration of the backlight 70.

The first panel 40 includes, for example, a first substrate 41, a circuit formation layer 42, a common electrode layer 43, an insulating layer 44, pixel electrodes 451, 452, . . . 45*n*, an orientation film layer 46, a liquid crystal layer 47, an orientation film layer 50, a color filter 51, and a second substrate 52, which are stacked from one side toward the other side in the third direction Dz. The first panel 40 illustrated in FIG. 4 is a transmissive liquid crystal display panel of what is called a fringe field switching (FFS) system or an in-plane switching (IPS) system, but a drive system that can be employed for the first panel 40 is not limited thereto and can be changed as appropriate.

The first substrate 41 and the second substrate 52 are, for example, glass substrate but are not limited thereto. The first substrate 41 and the second substrate 52 simply needs to be light-transmitting substrates on which an electrode as well as wiring, a capacitor, and a semiconductor circuit that are to be coupled to the electrode can be formed and between which the liquid crystal layer 47 can be sealed.

The circuit formation layer 42 has a multilayered structure including a plurality of layers in which the wiring and the semiconductor circuit are formed. This multilayered structure includes a plurality of insulating layers, a wiring layer formed between the insulating layers, and a semiconductor. The semiconductor serves as a semiconductor circuit (switching element) configured to open and close wiring coupling to the pixel electrodes 451, 452, . . . , 45*n*.

The common electrode layer 43 is an electrode provided with a predetermined constant potential. The insulating layer 44 insulates the common electrode layer 43 from pixel electrodes 45. The pixel electrodes 451, 452, . . . , 45*n* are individually provided to different sub pixels 49, respectively. The potentials of the pixel electrodes 451, 452, . . . , 45*n* are individually controlled with the potential of the common electrode layer 43 as a reference, whereby the orientation of liquid crystal molecules is controlled at the positions of the pixel electrodes 451, 452, . . . , 45*n*. Thus, the degree of transmission of light emitted from the backlight 70 and transmitting through the first panel 40 is individually controlled at each sub pixel 49. The liquid crystal molecules are included in the liquid crystal layer 47. The potential of each of the pixel electrodes 451, 452, . . . , 45*n* corresponds to a pixel signal included in image data that is input to the first panel 40. Although not illustrated, the first panel 40 includes a display driver integrated circuit (DDIC) having a function to individually control the potentials of the pixel electrodes 451, 452, . . . , 45*n* based on the image data. A configuration can be employed in which the vertical positions of a common electrode (the common electrode layer 43) and the pixel electrodes 45 are reversed from those of the example illustrated in FIG. 4. In this case, the common electrode has one or more slits at positions opposite to the pixel electrodes 45.

The orientation film layer 46 and the pixel 48 determine the initial orientation of liquid crystal molecules included in the liquid crystal layer 47 sandwiched therebetween. The color filter 51 limits the color of light transmitted through each sub pixel 49. The color filter 51 transmits red (R) light in an area corresponding to the first sub pixel 49R, transmits green (G) light in an area corresponding to the second sub pixel 49G, and transmits blue (B) light in an area corresponding to the third sub pixel 49B.

The second panel 10 includes, for example, a first substrate 11, a circuit formation layer 12, an orientation film 13, a pixel electrode layer, a liquid crystal layer 16, an orientation film 20, a counter electrode 21, and a second substrate 22, which are stacked from one side toward the other side in the third direction Dz. The pixel electrode layer includes light-transmitting electrodes 141, 142, . . . , 14*k* and light-transmitting electrodes 151 and 152. The second panel 10 illustrated in FIG. 4 is what is called a transmissive liquid crystal panel of a twisted nematic (TN) system, but a drive system that can be employed at the second panel 10 is not limited thereto and can be changed as appropriate.

The first substrate 11 and the second substrate 22 are, for example, glass substrates but not limited thereto. The first substrate 11 and the second substrate 22 simply need to be light-transmitting substrates on which an electrode as well as wiring, a capacitor, and a semiconductor circuit that are to be coupled to the electrode can be formed and between which the liquid crystal layer 16 can be sealed. The wiring and the semiconductor circuit to be coupled to the electrode are included in the circuit formation layer 12.

The circuit formation layer 12 has a multilayered structure including a plurality of layers in which the wiring and the semiconductor circuit are formed. This multilayered structure includes a plurality of insulating layers, a wiring layer formed between the insulating layers, and a semiconductor. The semiconductor serves as a semiconductor circuit (switching element) configured to open and close wiring coupling to the light-transmitting electrodes 141, 142, . . . , 14*k* and the light-transmitting electrodes 151 and 152. A configuration can be employed in which the circuit formation layer 12 of the second panel 10 is omitted and the pixel electrode layer is formed on the first substrate 11.

The light-transmitting electrodes 141, 142, . . . , 14*k* and the light-transmitting electrodes 151 and 152 are opposite to the counter electrode 21 with the liquid crystal layer 16 interposed therebetween. The light-transmitting electrodes 141, 142, . . . , 14*k* and the light-transmitting electrodes 151 and 152 are in the same layer in a multilayered structure of the second panel 10. The counter electrode 21 is provided with a predetermined constant potential. The potentials of the light-transmitting electrodes 141, 142, . . . , 14*k* and the light-transmitting electrodes 151 and 152 are individually controlled with the potential of the counter electrode 21 as a reference, whereby the orientation of liquid crystal molecules LC (refer to FIGS. 5 and 6) is controlled at the positions of the light-transmitting electrodes 141, 142, . . . , 14*k* and the light-transmitting electrodes 151 and 152. The liquid crystal molecules LC are included in the liquid crystal layer 16. A configuration related to control of the orientation of the liquid crystal molecules LC and the potentials of the light-transmitting electrodes 141, 142, . . . 14$k$ and the light-transmitting electrodes 151 and 152 will be described later.

The first polarization plate 81, the second polarization plate 82, and the third polarization plate 83 limit the polarization direction of passing light. The first polarization plate 81 and the third polarization plate 83 allow light polarized in the second direction Dy (polarization component having a polarization axis in the second direction Dy) to pass therethrough. The second polarization plate 82 allows light polarized in the first direction Dx (polarization component having a polarization axis in the first direction Dx) to pass therethrough. The first polarization plate 81 is attached to the first substrate 41. The second polarization plate 82 is attached to the second substrate 52. The third polarization plate 83 is attached to the second substrate 22. The bonding layer 91 bonds the second panel 10 to the first panel 40. Specifically, the bonding layer 91 bonds the second polarization plate 82 to the first substrate 11. Similarly, the first polarization plate 81 and the first substrate 41 are bonded with a bonding layer (not illustrated) interposed therebetween, and the third polarization plate 83 and the second substrate 22 are bonded with a bonding layer (not illustrated) interposed therebetween. The thickness of the bonding layer 91 in the third direction Dz is greater than that of the bonding layer between the first polarization plate 81 and the first substrate 41 and that of the bonding layer between the third polarization plate 83 and the second substrate 22.

Figure 5:
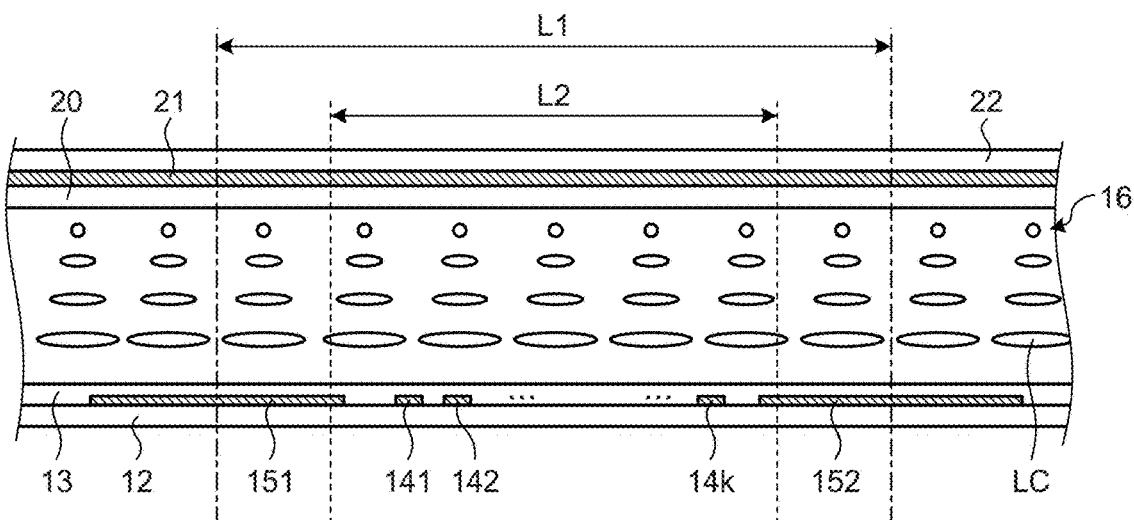
FIG. 5 is a schematic diagram illustrating the initial orientation of liquid crystal molecules included in a liquid crystal layer.
Figure 5:
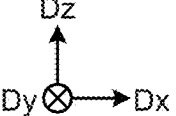
Figure 6:
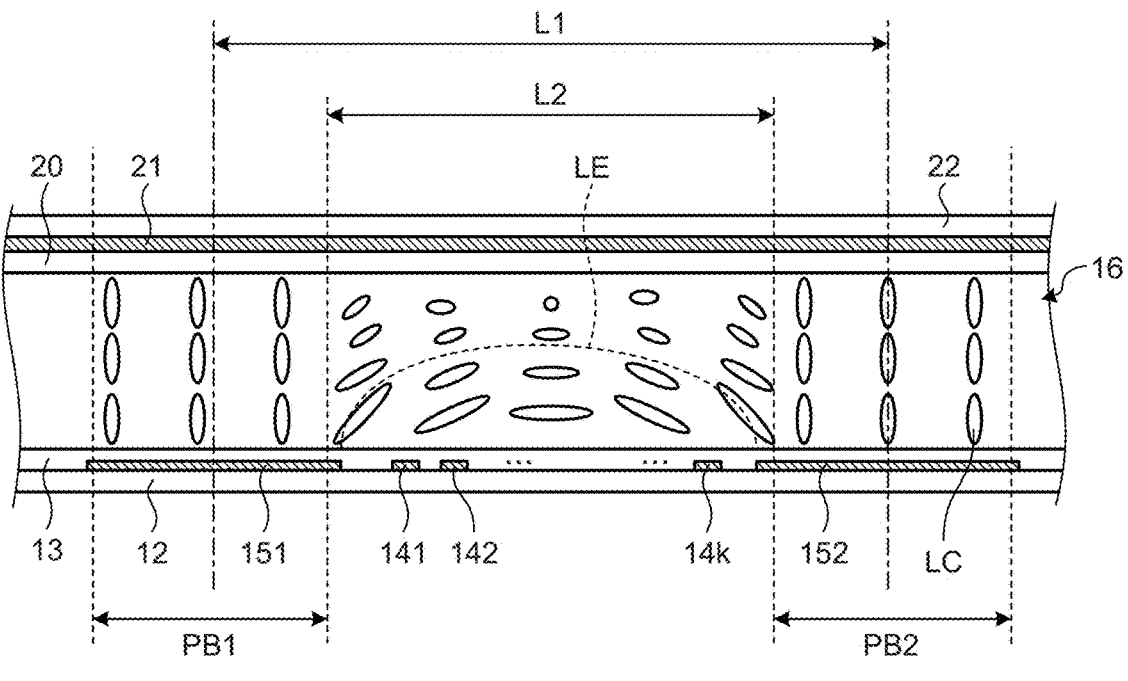
FIG. 6 is a schematic diagram illustrating the orientation of the liquid crystal molecules in an operational state in which a second panel functions as a parallax barrier.
Figure 6:
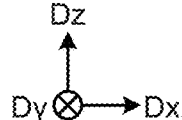

FIG. 5 is a schematic diagram illustrating the initial orientation of the liquid crystal molecules LC included in the liquid crystal layer 16 of the second panel 10. FIG. 5 and FIG. 6 described later illustrate the components from the circuit formation layer 12 to the second substrate 22 among the components included in the second panel 10.

The orientation film 13 and the orientation film 20 determine the initial orientation of the liquid crystal molecules LC included in the liquid crystal layer 16 sandwiched therebetween. The initial orientation is an orientation of the liquid crystal molecules LC when there is no difference between a potential of the counter electrode 21 and a potential of a pixel electrode (for example, the light-transmitting electrodes 141, 142, . . . , 14$k$ and the light-transmitting electrodes 151 and 152) opposite to the counter electrode 21 with the liquid crystal layer 16 interposed therebetween. In the present embodiment, what is called positive liquid crystal molecules are used.

The orientation film 13 is provided to cause the longitudinal direction of each liquid crystal molecule LC, which has a spindle shape, to be along the first direction Dx. The orientation film 20 is provided to cause the longitudinal direction of each liquid crystal molecule LC to be along the second direction Dy. In other words, the orientation films have orientation directions orthogonal to each other in plan view. Thus, the longitudinal direction of a liquid crystal molecule LC at a position closer to the orientation film 13 is closer to a direction along the first direction Dx; and the longitudinal direction of a liquid crystal molecule LC at a position closer to the orientation film 20 is closer to a direction along the second direction Dy. In other words, the longitudinal direction of each liquid crystal molecule LC corresponds to the relative relation between the distance to the orientation film 13 and the distance to the orientation film 20. When a plurality of liquid crystal molecules LC arranged in the third direction Dz in the liquid crystal layer 16 are viewed, it looks like that, from the orientation film 13 side toward the orientation film 20 side, the longitudinal directions of the liquid crystal molecules LC change to twist from the first direction Dx to the second direction Dy. In FIG. 5, such change of the longitudinal directions of the liquid crystal molecules LC arranged in the third direction Dz is expressed by illustrating the liquid crystal molecules LC in such a manner that liquid crystal molecules LC on the orientation film 13 side are relatively large in the first direction Dx and liquid crystal molecules LC on the orientation film 20 side are relatively small in the first direction Dx. The liquid crystal layer 16 including the liquid crystal molecules LC having such initial orientations changes the polarization direction of light from a direction along the first direction Dx to a direction along the second direction Dy. Thus, light having passed through the second polarization plate 82 passes through the second panel 10 and the third polarization plate 83. The orientation directions of the orientation films intersect each other at 90° in the present embodiment but may intersect each other at any other angle, for example, an angle of 90° +10°.

FIG. 6 is a schematic diagram illustrating the orientation of the liquid crystal molecules LC in an operational state in which the second panel 10 functions as the parallax barrier. In the state illustrated in FIG. 6, each of the light-transmitting electrodes 151 and 152 is provided with a signal that maximizes the potential difference between the electrode and the counter electrode 21. The maximized potential difference is the maximum potential difference within a predetermined range in which a potential difference between the counter electrode 21 and an electrode opposite to the counter electrode 21 with the liquid crystal layer 16 interposed therebetween can fall. With the maximum potential difference, the longitudinal direction of each liquid crystal molecule LC positioned between the light-transmitting electrode 151 or the light-transmitting electrode 152 and the counter electrode 21 is twisted in the third direction Dz. In an area in which the longitudinal direction of each liquid crystal molecule LC is along the third direction Dz, the polarization direction of light, which is along the first direction Dx, is not caused to be along the second direction Dy. Consequently, light in the area does not pass through the third polarization plate 83. Thus, this area of the second panel 10 is an area through which no light passes when viewed from the user. In other words, this area can be set as the light-blocking region PB1 and PB2 described with reference to FIGS. 1 and 2. In FIG. 6, the light-blocking region PB1 is an area in which the light-transmitting electrode 151 is provided, and the light-blocking region PB2 is an area in which the light-transmitting electrode 152 is provided. With this configuration, an area between the light-transmitting electrode 151 and the light-transmitting electrode 152 functions as the opening part of the parallax barrier described with reference to FIGS. 1 and 2, the light-transmitting electrode 151 forming a light-blocking area that functions as the light-blocking region PB1, the light-transmitting electrode 152 forming a light-blocking area that functions as the light-blocking region PB2. In FIGS. 5 and 6, the area that functions as the opening part is indicated by the width L2.

The light-transmitting electrodes 141, 142, . . . , 14$k$ are arranged between the light-transmitting electrode 151 and the light-transmitting electrode 152 in the first direction Dx. In the state illustrated in FIG. 6, each of the light-transmitting electrodes 141, 142, . . . , 14$k$ is provided with a signal that sets the potential difference between the electrode and the counter electrode 21 to be smaller than the maximum potential difference. Specifically, when viewed in the first direction, a light-transmitting electrode closer to the light-transmitting electrodes 151 and 152 is greater in the potential difference from the counter electrode 21 than a light-transmitting electrode farther from the light-transmitting electrodes 151 and 152. Thus, as illustrated in FIG. 6, the orientation of the liquid crystal molecules LC is equivalent to the initial orientation (refer to FIG. 5) at a position where the distance in the first direction Dx is longest, in other words, the middle position between the light-transmitting electrode 151 and the light-transmitting electrode 152 in the first direction Dx. In addition, the orientation of the liquid crystal molecules LC is controlled so that one end of each spindle-shaped liquid crystal molecule LC in the longitudinal direction is further directed to the light-transmitting electrode 151 side as the position thereof is closer to the light-transmitting electrode 151 from the middle position. The orientation of the liquid crystal molecules LC is also controlled so that one end of each spindle-shaped liquid crystal molecule LC in the longitudinal direction is further directed to the light-transmitting electrode 152 side as the position thereof is closer to the light-transmitting electrode 152 from the middle position. The liquid crystal layer 16 including the liquid crystal molecules LC having an orientation thus controlled in the width L2 has refractive index distribution in the width L2 and causes light travelling from the orientation film 13 side toward the orientation film 20 side between the light-transmitting electrode 151 and the light-transmitting electrode 152 to emit in a predetermined direction. FIG. 6 illustrates an arc LE with a dashed line to indicate an area that provides such an optical effect same as that of a lens in the liquid crystal layer 16. Hereinafter, an expression "the orientation of the liquid crystal molecules LC is controlled to achieve a function as a lens" means that the orientation of the liquid crystal molecules LC in the width L2 is controlled to provide the above-described optical effect.

As described above with reference to FIG. 6, the second panel 10 has part that blocks light to function as the light-blocking regions PB1 and PB2 of the parallax barrier, and the opening part of the parallax barrier formed between the light-blocking regions PB1 and PB2. In the opening part of the second panel 10, the orientation of the liquid crystal molecules LC is controlled to achieve a function as a lens. With this configuration, the directivity of light having passed through the parallax barrier can be ensured as compared to a case in which light is simply transmitted through the opening part as described with reference to FIGS. 1 and 2. As a result, optical properties at each of the multiple viewpoints can be ensured, and thus, decrease in the luminance of an image at each viewpoint (or each pixel included in the image) can be reduced.

In FIGS. 4, 5, and 6, the widths of the light-transmitting electrodes 141, 142, . . . , 14k in the first direction Dx are less than the widths of the light-transmitting electrodes 151 and 152 in the first direction Dx. This is because it becomes easier to control the orientation of the liquid crystal molecules LC to achieve a function as a lens by individually controlling the potential of each of the light-transmitting electrodes 141, 142, . . . , 14k as the number of the light-transmitting electrodes 141, 142, . . . , 14k arranged in the width L2 increases.

In FIG. 6, the width of the light-transmitting electrode 151 in the first direction Dx corresponds to the width of the light-blocking region PB1 in the first direction Dx, and the width of the light-transmitting electrode 152 in the first direction Dx corresponds to the width of the light-blocking region PB2 in the first direction Dx, but the widths of the light-blocking regions PB1 and PB2 in the first direction Dx are not necessarily determined in this manner. The following describes more specific forms of the light-transmitting electrodes 141, 142, . . . , 14k and the light-transmitting electrodes 151 and 152 and exemplary potential control thereof with reference to FIGS. 7 to 10.

Figure 7:
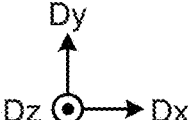
FIG. 7 is a schematic diagram illustrating a configuration related to potential control of a plurality of light-transmitting electrodes provided in a pixel electrode layer.

FIG. 7 is a schematic diagram illustrating a configuration related to potential control of a plurality of light-transmitting electrodes 141, 142, . . . , 14B and the light-transmitting electrodes 151 and 152 provided in the pixel electrode layer. The light-transmitting electrodes 141, 142, . . . , 14B illustrated in FIG. 7 are examples of the light-transmitting electrodes 141, 142, . . . , 14k described with reference to FIGS. 4, 5, and 6 when the value of k is 11. The index k is zero or a natural number. The light-transmitting electrodes 141, 142, . . . , 14B are arranged in the order of the light-transmitting electrodes 141, 142, 143, 144, 145, 146, 147, 148, 149, 14A, and 14B from one side toward the other side in the first direction Dx.

A power circuit 71 controls potentials to be provided to a plurality of electrodes (for example, the light-transmitting electrodes 141, 142, . . . , 14B and the light-transmitting electrodes 151 and 152) included in the pixel electrode layer. In FIG. 7, the power circuit 71 is coupled to a plurality of potential lines. FIG. 7 exemplarily illustrates seven potential lines to be provided with potentials V1, V2, V3, V4, V5, V6, and V7. The potential lines extend in the circuit formation layer 12.

The light-transmitting electrodes 151 and 152 are coupled to the signal line to be provided with the potential V1. The light-transmitting electrodes 141 and 14B are coupled to the signal line to be provided with the potential V2. The light-transmitting electrodes 142 and 14A are coupled to the signal line to be provided with the potential V3. The light-transmitting electrodes 143 and 149 are coupled to the signal line to be provided with the potential V4. The light-transmitting electrodes 144 and 148 are coupled to the signal line to be provided with the potential V5. The light-transmitting electrodes 145 and 147 are coupled to the signal line to be provided with the potential V6. The light-transmitting electrode 146 is coupled to the signal line to be provided with the potential V7. The power circuit 71 provides the potentials V1, V2, V3, V4, V5, V6, and V7 to the respective potential lines, thereby providing the potentials V1, V2, V3, V4, V5, V6, and V7 to a plurality of electrodes coupled to the potential lines.

Some of the potentials V1, V2, V3, V4, V5, V6, and V7 may be equal but at least the potential V7 is lower than the potential V1. As described above, among the potentials V1, V2, V3, V4, V5, V6, and V7, the potential V1 is a potential at which the potential difference from the counter electrode 21 is maximum. The potential of the counter electrode 21 is preferably equal to V7. In the embodiment, the potential of the counter electrode 21 is constant. In addition, in the embodiment, the potential of each of the light-transmitting electrodes 141, 142, . . . , 14k and the light-transmitting electrodes 151 and 152 becomes a potential provided through the signal line coupled to the light-transmitting electrode. The power circuit 71 outputs pulse signals corresponding to the potentials V1, V2, V3, V4, V5, V6, and V7. The potential V7 may be constant to have a constant relation with the potential of the counter electrode 21. The potential of the counter electrode 21 may be variable. In a specific example, the potential of the counter electrode 21 may be periodically switched for inversion drive of the liquid crystal layer 16. In this case, the potential V7 is switched in accordance with switching of the counter electrode 21 so that no potential difference from the counter electrode 21 occurs.

The power circuit 71 may be mounted in any desired form. For example, the power circuit 71 may be mounted on the first substrate 11 and coupled to wirings in the circuit formation layer 12 or may be mounted on an external flexible printed board coupled to a wiring pattern that is coupled to the circuit formation layer 12 and extends on the first substrate 11.

As illustrated in FIG. 7, the light-transmitting electrode 151 and the light-transmitting electrodes 141, 142, 143, 144, 145, 146, 147, 148, 149, 14A, and 14B, and the light-transmitting electrode 152 are arranged from the one side (the left side in the sheet of FIG. 7) toward the other side (the right side in the sheet of FIG. 7) in the first direction Dx. The light-transmitting electrode 141 is disposed on the other side of the light-transmitting electrode 152. Although not illustrated in FIG. 7, the light-transmitting electrodes 141, 142, . . . , 14B are arranged on the other side of the light-transmitting electrode 152 in reality. The light-transmitting electrode 14B is disposed, toward the other side, on the one side of the light-transmitting electrode 151. Although not illustrated in FIG. 7, the light-transmitting electrodes 14B, 14A, . . . , and 141 are arranged, toward the one side, on the one side of the light-transmitting electrode 151 in reality.

The aspects of the light-transmitting electrodes 151 and 152 and potentials provided thereto are equal except that the arrangement positions of the electrodes are different from each other. Thus, when each of the light-transmitting electrodes 151 and 152 is referred to as a light-transmitting electrode (second light-transmitting electrode) 15 and a set of the light-transmitting electrodes 141, 142, . . . , 14$k$ is collectively referred to as a light-transmitting electrode (first light-transmitting electrode) 14, it can be expressed that the light-transmitting electrodes 15 and 14 are alternately arranged in the first direction Dx. The light-transmitting electrode 14 is sandwiched between two light-transmitting electrodes 15.

Figure 8:
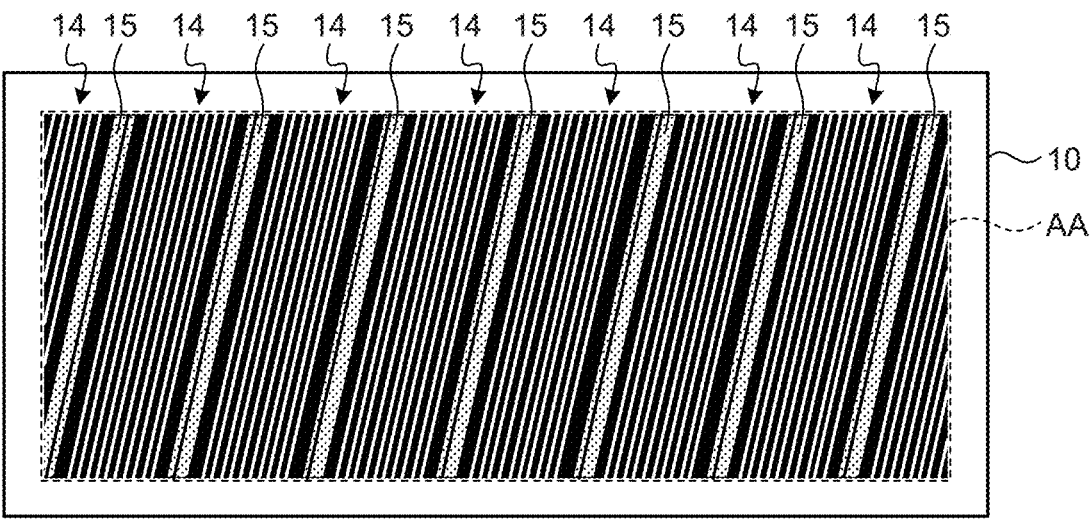
FIG. 8 is a schematic diagram illustrating exemplary extension directions of light-transmitting electrodes of the second panel in a display region.
Figure 8:
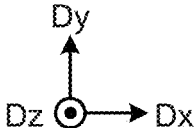

FIG. 8 is a schematic diagram illustrating exemplary extension directions of the light-transmitting electrodes 14 and 15 of the second panel 10 in the display region AA. As illustrated in FIG. 8, the extension directions of each light-transmitting electrode 15 and the electrodes (light-transmitting electrodes 141, 142, . . ., and 14$k$) included in the light-transmitting electrode 14 are along a plane orthogonal to the third direction Dz and intersect the first direction Dx and the second direction Dy. In the example illustrated in FIG. 8, the light-transmitting electrodes 15 and the electrodes included in the light-transmitting electrode 14 are continuous from one side toward the other side in the second direction Dy without discontinuity, and extend with a pre-determined width that is not changed.

The light-transmitting electrodes 15 and the electrodes included in each light-transmitting electrode 14 have light-transmitting properties. Specifically, each of the light-transmitting electrodes 15 and the electrodes included in the light-transmitting electrode 14 is formed of a light-transmitting conductive material such as indium tin oxide (ITO).

Figure 9:
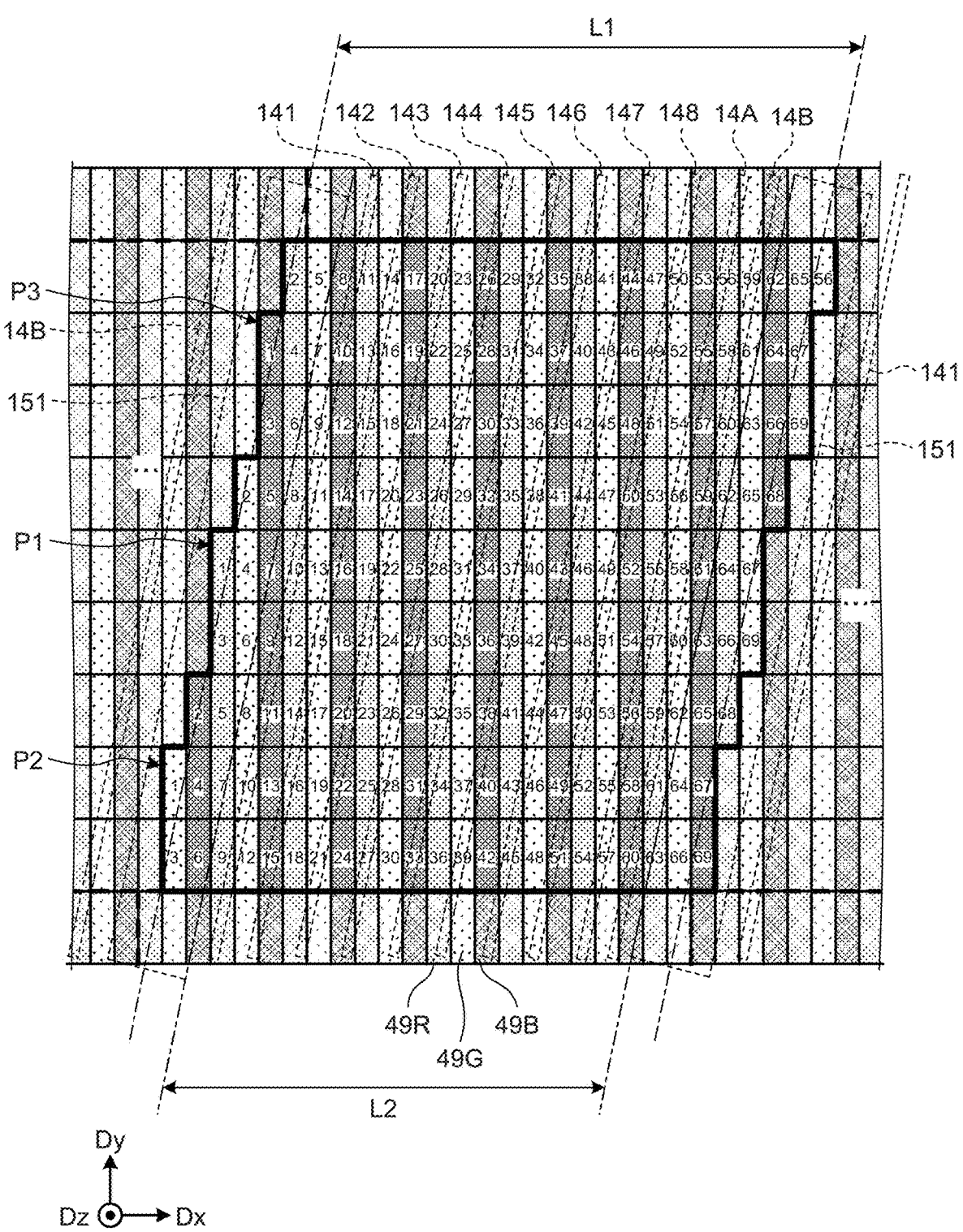
FIG. 9 is a schematic diagram illustrating overlapping of the light-transmitting electrodes with sub pixels of the second panel at a planar viewpoint.

FIG. 9 is a schematic diagram illustrating overlapping of the light-transmitting electrodes 141, 142, . . . , 14B and the light-transmitting electrodes 151 and 152 of the second panel 10 with the sub pixels 49 at a planar viewpoint. The planar viewpoint is a viewpoint in a front view of a plane orthogonal to the third direction Dz. In the example illustrated in FIG. 9, a plurality of sub pixels 49 arranged in the second direction Dy are the same in color of light emitted from each sub pixel 49. In other words, a column of the first sub pixels 49R arranged in the second direction Dy, a column of the second sub pixels 49G arranged in the second direction Dy, and a column of the third sub pixels 49B arranged in the second direction Dy are periodically arranged in the first direction Dx in the display region AA of the first panel 40.

Assume that an area sandwiched between a line dividing the light-transmitting electrode 151 into two in its longitudinal direction and a line dividing the light-transmitting electrode 152 into two in its longitudinal direction is regarded as the emission area L1. In the emission area L1, 23 sub pixels 49 are arranged in the first direction Dx in the example illustrated in FIG. 9. Assume that a row of the sub pixels 49 arranged in the first direction Dx is a pixel row. In the example illustrated in FIG. 9, two pixel rows that are the same in the position of a set of the 23 sub pixels 49 included in one emission area L1 on the one side in the first direction Dx and are the same in the position thereof on the other side in the first direction Dx, and one pixel row in which the positions of the 23 sub pixels 49 on the one side and the other side in the first direction Dx are shifted by one toward the one side relative to the two rows, are alternately arranged in the second direction Dy. In other words, in the example illustrated in FIG. 9, the light-transmitting electrodes 14 and 15 are tilted in the first direction Dx and the second direction Dy such that the positions of the 23 sub pixels 49 on the one side and the other side in the first direction Dx are shifted by one toward the one side at the frequency of two pixel rows in three pixel rows in the emission area L1.

The light-transmitting electrodes 14 and 15 having widths corresponding to approximately eleven pixel rows in the second direction Dy are illustrated with dashed lines in FIG. 9, but in reality, each of the light-transmitting electrodes 15 and the electrodes included in the light-transmitting electrode 14 are continuous from the one side toward the other side in the second direction Dy as illustrated in FIG. 8.

In the example illustrated in FIG. 9, the width of each electrode included in the light-transmitting electrode 14 in the first direction Dx is 8.5 μm. The width of each light-transmitting electrode 15 in the first direction Dx is 150 nm. The interval between electrodes adjacent to each other in the first direction Dx in the pixel electrode layer of the second panel 10 is 8.5 μm. The pitch of the sub pixels 49 in the first direction Dx in the first panel 40 is 3 μm to 20 μm, more preferably, 10 μm to 15 μm. The widths, interval, and pitch of the components exemplarily described above are merely exemplary and not limited thereto, and can be changed as appropriate.

In the example illustrated in FIG. 9, the opening width (width L2) of the opening part in the first direction Dx in one emission area L1 is the width between an edge on the other side included in the light-transmitting electrode 151 positioned on the one side in the first direction Dx and an edge on the one side included in the light-transmitting electrode 152 positioned on the other side in the first direction Dx. The light-transmitting electrodes 141 and 14B positioned at the ends of the light-transmitting electrode 14 may be positioned outside the width L2. In other words, the light-transmitting electrodes 141 and 14B may be included in a light-blocking part of the parallax barrier. In this case, as is the case with the potential V2, a potential provided to the electrode of the light-transmitting electrode 14 at a position closer to the light-transmitting electrode 15, is equal to the potential V1 that is the same as the potential of the light-transmitting electrode 15. In this manner, not only the light-transmitting electrode 15 but also some electrodes closer to the light-transmitting electrode 15 among the electrodes included in the light-transmitting electrode 14 may be used to form the light-blocking part of the parallax barrier.

Figure 10:
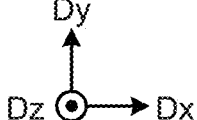
FIG. 10 is a diagram illustrating light-blocking regions generated in accordance with the positional relation between an emission area illustrated in FIG. 9 and an opening part of a parallax barrier.

FIG. 10 is a diagram illustrating the light-blocking regions PB1 and PB2 generated in accordance with the positional relation between the emission area L1 illustrated in FIG. 9 and the opening part of the parallax barrier. The extension directions of the light-blocking regions PB1 and PB2 and the opening part of the parallax barrier are along the extension direction of each light-transmitting electrode 15.

The following describes examples of the potentials V1, V2, V3, V4, V5, V6, and V7 and the potential of the counter electrode 21 when the light-blocking regions PB1 and PB2 illustrated in FIG. 10 are formed. The potential V1 is 10 volts (V). The potential V2 is 6 volts (V). The potential V3 is 3.5 volts (V). The potential V4 is 1.8 volts (V). The potential V5 is 1.1 volts (V). The potential V6 is 0.7 volts (V). The potential V7 and the potential of the counter electrode 21 are 0 volts (V).

The light-blocking regions PB1 and PB2 are identical to each other as light-blocking parts of the parallax barrier except that their positions relative to one emission area L1 are different. Although not illustrated, another emission area L1 is generated on the one side of the light-blocking region PB1 in the first direction Dx. In addition, another emission area L1 is generated on the other side of the light-blocking region PB2 in the first direction Dx. Thus, two light-blocking parts of the parallax barrier are generated with one emission area L1 interposed therebetween. Consequently, a light-blocking part and an opening part of the parallax barrier are alternately arranged from the one side toward the other side in the first direction Dx.

Numbers provided to the first sub pixels 49R, the second sub pixels 49G, the third sub pixels 49B illustrated in FIGS. 9 and 10 indicates numbers given at the ends of reference signs of the respective optical axes R1, R2, . . . , Rn (n is the number of the optical axes). For example, the first sub pixel 49R, the second sub pixel 49G, and the third sub pixel 49B provided with "1" in FIG. 9 are a first sub pixel 49R, a second sub pixel 49G, and a third sub pixel 49B through which light passes which is emitted in an incidence direction on the viewpoint E1 as light having the optical axis R1. In other words, pixels provided with the number "1" form an image at a first viewpoint (viewpoint E1) among the multiple viewpoints. Pixels provided with the number "2" form an image at a second viewpoint (viewpoint E2) among the multiple viewpoints. In the present example, images are formed at 69 viewpoints in total. Sub pixels 49 provided with the same number are included in different pixel rows. For example, a first sub pixel 49R provided with "1" is at a position P1. A second sub pixel 49G provided with "1" is at a position P2. A third sub pixel 49B provided with "1" is at a position P3. Similarly for the numbers other than "1", a first sub pixel 49R, a second sub pixel 49G, and a third sub pixel 49B provided with the same number are included in different pixel rows. In other words, in the present embodiment, the first panel 40 forms images corresponding to a plurality of viewpoints (in the present example, 69 viewpoints) by using pixels on three rows belonging to the emission area L1. A method of image formation will be described later. In the region defined by L1 in FIG. 9, numbers are provided to pixels, in particular, on nine rows indicated by a bold frame; and the numbers in the frame are repeatedly provided to the other pixels in the same order as in the frame. The images are displayed only when a multiple-viewpoint image is formed. In a case of normal display (2D display), one 2D image is formed in the entire display region of the first panel 40. In this case, the second panel 10 is not driven, and light from the first panel 40 passes through the second panel without being affected by the refractive index distribution in the second panel 10.

The configuration in which the light-transmitting electrodes 14 and 15 are alternately arranged in the first direction Dx is described above as the configuration of the pixel electrode layer in the second panel 10, but the configuration of the pixel electrode layer is not limited thereto. The following describes another example aspect of the configuration of the pixel electrode layer with reference to FIGS. 11 to 15. FIGS. 11 to 15 illustrate the configuration from the circuit formation layer 12 to the second substrate 22 among the components included in the second panel 10 and omit illustration of the liquid crystal layer 16. In FIGS. 11 to 15, the arc LE indicates an area in which the orientation of the liquid crystal molecules LC is controlled to achieve a function as a lens in the width L2.

Figure 11:
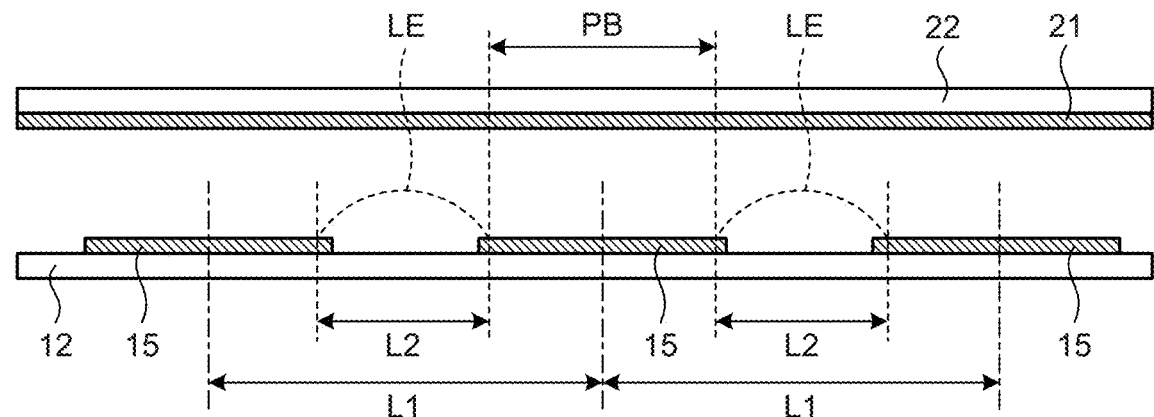
FIG. 11 is a schematic diagram illustrating an example in which the pixel electrode layer includes second light-transmitting electrodes but not first light-transmitting electrodes.
Figure 11:
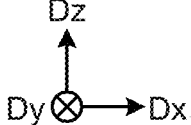

FIG. 11 is a schematic diagram illustrating an example in which the pixel electrode layer includes the light-transmitting electrodes 15 but not the light-transmitting electrodes 14. As illustrated in FIG. 11, the light-transmitting electrodes 15 may be arranged in the first direction Dx at intervals corresponding to the width L2 in the first direction Dx. In other words, all light-transmitting electrodes 14 that would be provided between the light-transmitting electrodes 15 may be omitted. In this case, the orientation of the liquid crystal molecules LC is controlled to achieve a function as a lens in the width L2 such that the longitudinal direction of each liquid crystal molecule LC between two light-transmitting electrodes 15 is closer to the initial orientation at a position further away from the light-transmitting electrodes 15.

Figure 12:
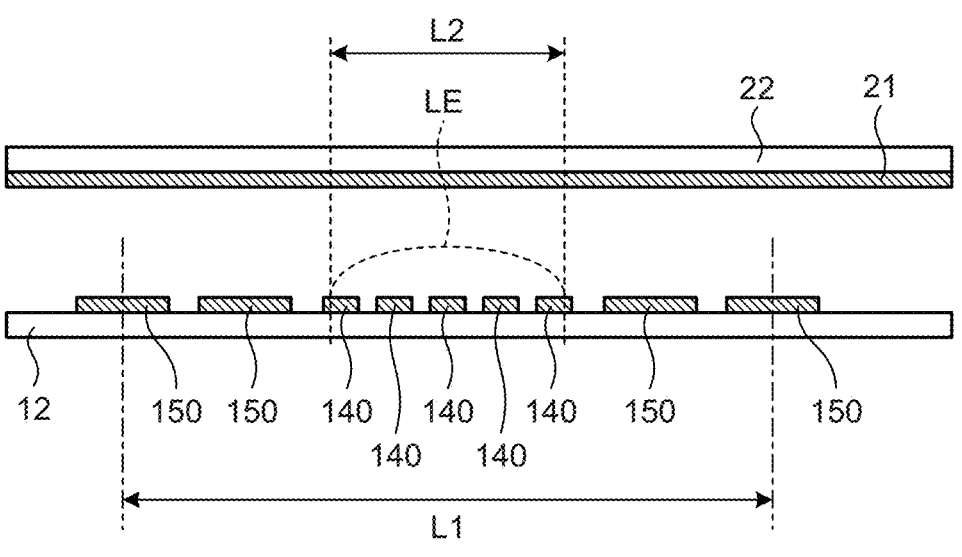
FIG. 12 is a schematic diagram illustrating an example in which a plurality of light-transmitting electrodes configured to control the orientation of liquid crystal molecules so that the liquid crystal molecules function as a lens and a plurality of light-transmitting electrodes having greater widths in a first direction than those of the light-transmitting electrodes configured to control the orientation of the liquid crystal molecules are provided.
Figure 12:
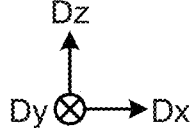

FIG. 12 is a schematic diagram illustrating an example in which a plurality of light-transmitting electrodes 140 for controlling the orientation of the liquid crystal molecules LC to achieve a function as a lens and a plurality of light-transmitting electrodes 150 each having a greater width in the first direction Dx than that of each light-transmitting electrode 140 are provided. As illustrated in FIG. 12, a plurality of light-transmitting electrodes 140 may be arranged in the first direction Dx in the width L2, and light-transmitting electrodes 150 may be arranged in a pair between which the light-transmitting electrodes 140 are sandwiched. In the example illustrated in FIG. 12, two pairs of light-transmitting electrodes 150 are provided with one arc LE interposed therebetween, but the number of light-transmitting electrodes 150 arranged in pairs with one arc LE interposed therebetween is freely determined.

The potential of each light-transmitting electrode 150 is controlled in the same manner as the above-described light-transmitting electrode 15. The potential of each of the light-transmitting electrodes 140 is individually controlled so that the potential difference from the counter electrode 21 is smaller at a position closer to the middle in the width L2 in the first direction Dx. A specific method for individually providing potential to the light-transmitting electrodes 140 and 150 is same as the method using the power circuit 71 and potential lines, which is described above with reference to FIG. 7.

Figure 13:
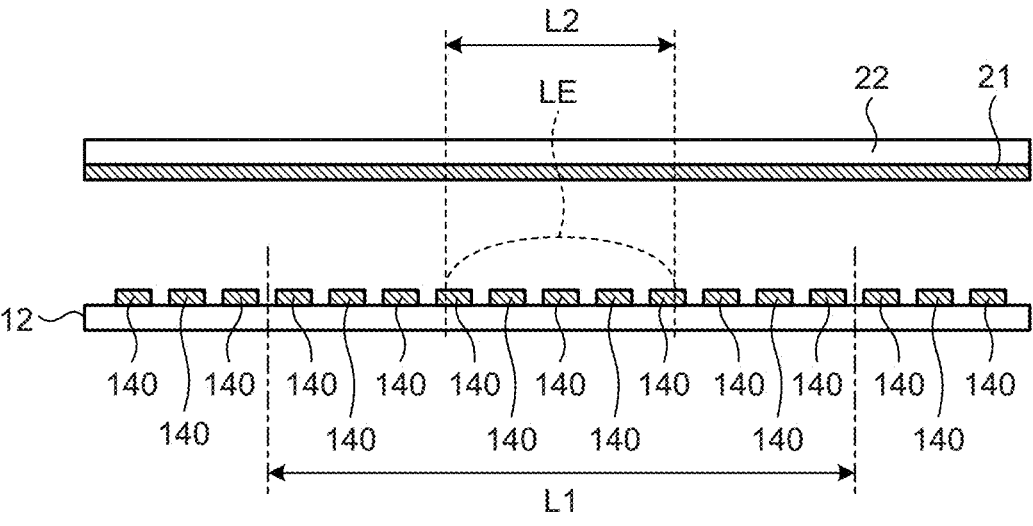
FIG. 13 is a schematic diagram illustrating an example in which a plurality of light-transmitting electrodes having the same width in the first direction are arranged in the first direction.
Figure 13:
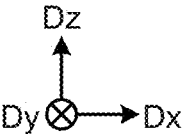

FIG. 13 is a schematic diagram illustrating an example in which a plurality of light-transmitting electrodes 140 having the same width in the first direction Dx are arranged in the first direction Dx. As illustrated in FIG. 13, the light-transmitting electrodes 140 may be arranged in the first direction Dx irrespective of being inside or outside the width L2.

The potential of each of a plurality of light-transmitting electrodes 140 inside the width L2 is individually controlled so that the potential difference between the light-transmitting electrode 140 and the counter electrode 21 is smaller at a position closer to the middle in the width L2 in the first direction Dx. The potential of each of a plurality of light-transmitting electrodes 140 outside the width L2 is controlled in the same manner as the above-described light-transmitting electrode 15.

Figure 14:
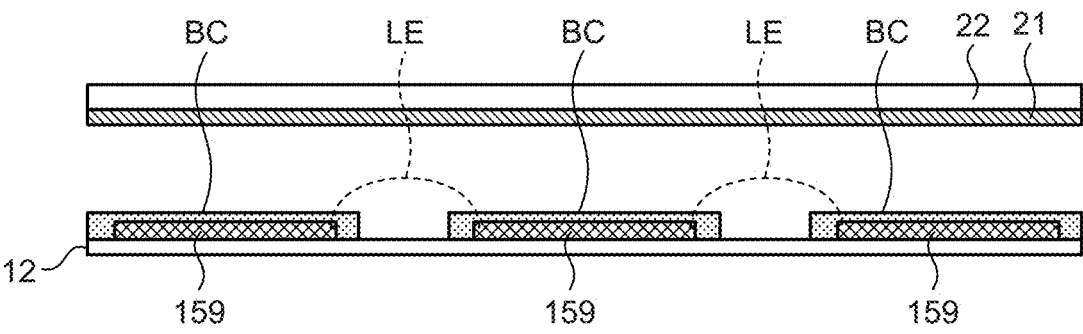
FIG. 14 is a schematic diagram illustrating an example in which a plurality of metal electrodes having the same width in the first direction are arranged in the first direction.
Figure 14:
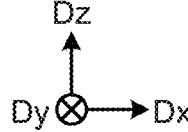

FIG. 14 is a schematic diagram illustrating an example in which a plurality of metal electrodes 159 having the same width in the first direction Dx are arranged in the first direction Dx. The metal electrodes 159 may be provided in place of the light-transmitting electrodes 15 described above with reference to FIG. 11. The metal electrode 159 is the same as the light-transmitting electrode 15 except that the metal electrode is a non-light-transmitting electrode, such as an electrode formed of a thin copper film.

Each metal electrode 159 illustrated in FIG. 14 is covered with a light-blocking part BC. The light-blocking part BC is a covering member formed of a light-blocking thin resin film. That is, in the example illustrated in FIG. 14, the light-blocking parts (above-described light-blocking regions PB1 and PB2) of the parallax barrier are formed as the metal electrodes 159 each covered with the light-blocking part BC to block light. The light-blocking parts BC may be omitted when electrodes are made of a light-blocking material like the metal electrodes 159. In a case in which the metal electrodes 159 are covered with the light-blocking parts BC, the metal electrodes 159 may be replaced with the light-transmitting electrodes 15.

Light-blocking members, such as the light-blocking parts BC, may be disposed at positions opposite to electrodes disposed corresponding to the light-blocking parts of the parallax barrier with the liquid crystal layer 16 interposed therebetween, instead of being provided as members covering the electrodes like the metal electrodes 159.

Figure 15:
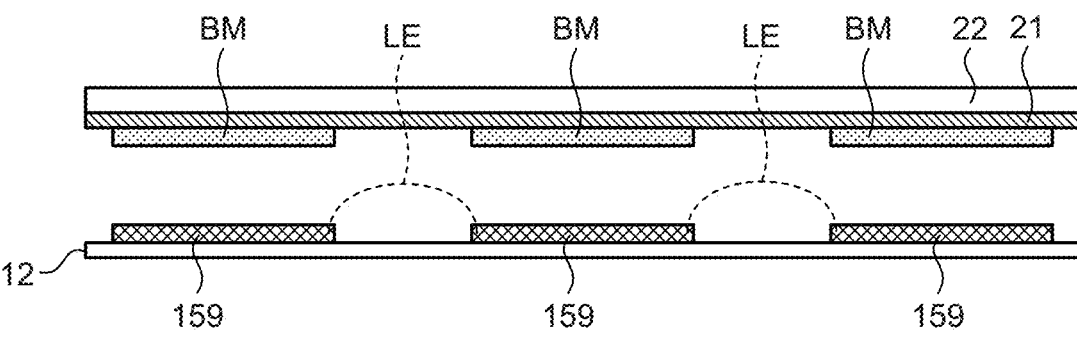
FIG. 15 is a diagram illustrating an example in which light-blocking parts are provided.
Figure 15:
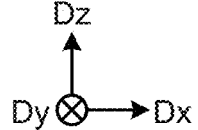

FIG. 15 is a diagram illustrating an example in which light-blocking parts BM are provided. As illustrated in FIG. 15, the light-blocking parts BM may be provided at positions opposite to the metal electrodes 159. The light-blocking parts BM are made of light-blocking thin film resin like the light-blocking parts BC. The light-blocking parts BM are provided on a side opposite to the second substrate 22 with the counter electrode 21 interposed therebetween.

Electrodes provided with the light-blocking parts BC or the light-blocking parts BM at opposite positions with the liquid crystal layer 16 interposed therebetween in the pixel electrode layer are not limited to the metal electrodes 159. Specifically, among a plurality of electrodes included in the pixel electrode layer, electrodes arranged outside the width L2 and corresponding to positions where the above-described light-blocking regions PB1 and PB2 are generated may be provided with the light-blocking parts BC or the light-blocking parts BM at opposite positions with the liquid crystal layer 16 interposed therebetween.

Among the electrodes included in the pixel electrode layer, the electrodes arranged outside the width L2 and corresponding to positions where the above-described light-blocking regions PB1 and PB2 are generated may be light-blocking electrodes like the metal electrodes 159.

Although the above description is based on the positional relation between the second panel 10 and the first panel 40 described above with reference to FIG. 3, the positional relation between the second panel 10 and the first panel 40 may be reversed.

Figure 16:
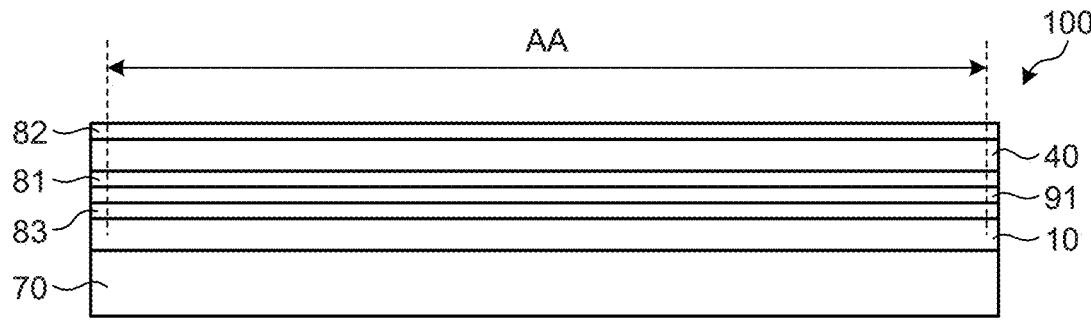
FIG. 16 is a diagram illustrating an exemplary main configuration of a liquid crystal display device.
Figure 16:
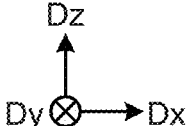

FIG. 16 is a diagram illustrating an exemplary main configuration of a liquid crystal display device 100. The liquid crystal display device 100 includes the backlight 70, the second panel 10, the third polarization plate 83, the bonding layer 91, the first polarization plate 81, the first panel 40, and the second polarization plate 82, which are stacked from one side toward the other side in the third direction Dz. The second polarization plate 82 is positioned on a user side closer to a user who recognizes a stereoscopic view, and the backlight 70 is positioned on a side opposite to the user side.

Figure 17:
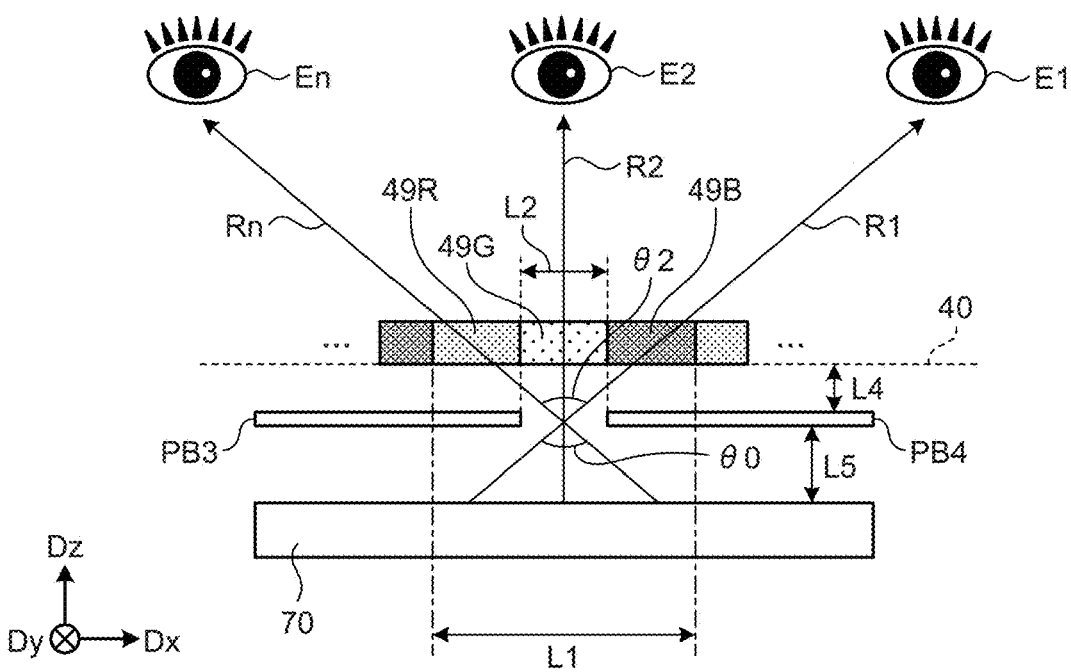
FIG. 17 is a schematic diagram illustrating a mechanism in which a stereoscopic view is formed in a case of the stacking order illustrated in FIG. 16.

FIG. 17 is a schematic diagram illustrating a mechanism in which a stereoscopic view is formed in a case of the stacking order illustrated in FIG. 16. The parallax barrier illustrated in FIG. 17 is formed with a light-blocking region PB3 and a light-blocking region PB4 positioned between the backlight 70 and the first panel 40. The light-blocking regions PB3 and PB4 are the same as the light-blocking regions PB1 and PB2 except that the positional relation between the backlight 70 and the first panel 40 is different therefrom. Thus, the light-blocking regions PB3 and PB4 can be generated in the same mechanism as that for the light-blocking regions PB1 and PB2 generated by potential provided to the light-transmitting electrode 151 and the light-transmitting electrode 152 illustrated in FIG. 6 and other figures.

The incident angle range θ0 and an emission angle range θ2 of light that can be emitted from the backlight 70 toward the viewpoints E1, E2, . . . , En through an opening part of the parallax barrier are determined in accordance with the width L2 and an interval L5 between the backlight 70 and the parallax barrier. In the configuration illustrated in FIGS. 16 and 17, an interval L4 between the parallax barrier and the first panel 40 is determined so that each of the optical axes R1, R2, . . . , Rn in the emission angle range θ2 passes through any of the first sub pixel 49R, the second sub pixel 49G, and the third sub pixel 49B.

The liquid crystal display device 1 or the liquid crystal display device 100 described above with reference to FIGS. 1 to 17 can display and output 3D image data including multi-angle images corresponding to the number (n) of the optical axes R1, R2, . . . , Rn. The following describes a method of producing 3D image data with reference to FIG. 18.

Figure 18:
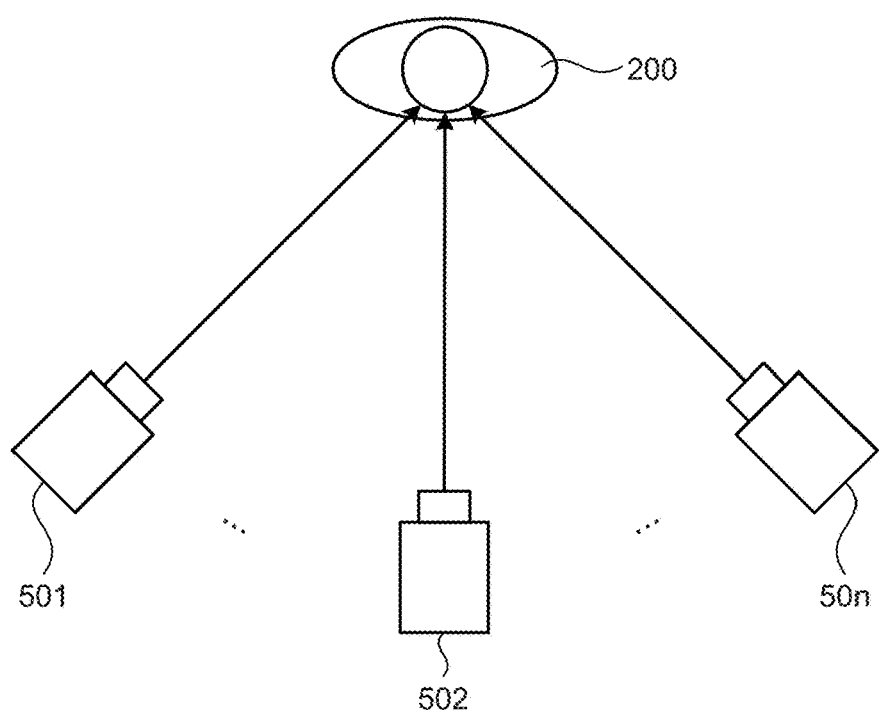
FIG. 18 is a schematic diagram illustrating a method of producing 3D image data including multi-angle images.

FIG. 18 is a schematic diagram illustrating the method of producing 3D image data including multi-angle images. The 3D image data is produced by, for example, combining pieces of image data individually captured by n cameras 501, 502, . . . , 50n arranged on an arc about an object 200. More specifically, in the embodiment, images of the object are captured at 69 viewpoint positions (viewpoint 1, viewpoint 2, . . . , 69 viewpoints) to form images corresponding to the 69 viewpoints. It is preferable that the viewpoint positions be arranged on an arc about the object in top view and the intervals therebetween are equal as illustrated in FIG. 18. When the first panel 40 has a display region made of N×M sub pixels, image data including pixels (0,0) to (N, M) is prepared for each of the 69 viewpoints to display a captured image at each viewpoint on the display region of the first panel 40. Such 69 pieces of image data can be obtained by capturing images of the object from the 69 viewpoints or can be produced by using computer graphics (CG) technologies based on an assumption that the object is viewed from the 69 viewpoints. A final display image is produced based on the 69 pieces of image data as described below with reference to FIG. 9. For example, image data corresponding to each pixel provided with "1" in FIG. 9 is acquired from image data of an image captured at viewpoint 1. In addition, image data corresponding to each pixel provided with "2" is acquired from image data of an image captured at viewpoint 2. Image data of the final display image can be obtained by repeating the same process for the 69 pieces of image data. Such image processing may be performed in a host coupled to the first panel 40, or such images may be produced and stored in a memory in advance. The final image has no meaning when visually recognized without the second panel 10. However, an image captured at each viewpoint can be visually recognized by visually recognizing an image displayed on the first panel 40 through the second panel 10, more specifically, by visually recognizing the displayed image from the position corresponding to each of the above-described 69 viewpoints.

Alternatively, 3D image data including multi-angle images can be produced by rotating the object 200 so as to change angles of the object 200 relative to fewer than n fixed cameras. In this case, the rotational axis of the object 200 is along an erection direction in which each camera is erected. The erection direction of each camera is, for example, orthogonal to the optical axis of the camera. Alternatively, 3D image data including multi-angle images can be produced by capturing images of the object 200 with what is called a light field camera.

As described above, according to the embodiment, a liquid crystal display device (for example, the liquid crystal display device 1 or the liquid crystal display device 100) includes: the first panel 40 configured to display an image by using light from the back surface side; the backlight 70 configured to irradiate the first panel 40 with light from the back surface side; and the second panel 10 configured to limit the emission area of the light so that the image output from the first panel 40 is visually recognized as a parallax image. The second panel 10 includes a plurality of first electrodes (for example, the light-transmitting electrodes 14 and 15) the potentials of which can be individually controlled and a second electrode (the counter electrode 21) provided at a position opposite to the first electrodes with liquid crystal interposed therebetween. The first electrodes are arranged in the first direction Dx along the second panel 10. The first electrodes are provided with such a potential that liquid crystal in a first state and liquid crystal in a second state alternately occur in the first direction Dx. The first state is a state of blocking light. The second state is a state of transmitting light and changing refractive index distribution of light incident from the backlight 70 side. Specifically, the second state corresponds to a state of being inside the width L2, and the first state corresponds to a state of being outside the width L2. In this manner, an area in the second state in the second panel 10 is limited to an area not in the first state, whereby the diameter in the first direction Dx of an arc of a liquid crystal lens formed in the second state, can be reduced as compared to a case in which the first state does not occur. When the diameter is small, the focal length of the lens is short. Thus, it is possible to achieve reduction of the focal length of the liquid crystal lens, which is required for shortening the interval L3 (refer to FIG. 2). In other words, with the liquid crystal lens, it is possible to provide a sufficient phase difference to light passing through the liquid crystal lens. Thus, the directivity of light from each pixel toward a corresponding viewpoint can be ensured. Alternatively, the optical properties of light emitted toward the corresponding viewpoint can be maintained. As described above, it is possible to form the parallax barrier by a liquid crystal panel and maintain the optical properties of emitted light at multiple viewpoints.

The first electrodes (for example, the light-transmitting electrodes 14 and 15) and the second electrode (the counter electrode 21) have light-transmitting properties. With this configuration, a normal two-dimensional image that is not a stereoscopic image can be displayed by setting the second panel 10 to a state in which light can pass through the entire area of the display region AA.

The light-blocking performance of the area that is in the first state (the light-blocking regions PB1, PB2, PB3, and PB4) can be improved when, among the first electrodes (for example, the light-transmitting electrodes 14 and 15), an electrode disposed corresponding to the liquid crystal that is in the first state has light-blocking properties.

The light-blocking performance of the area that is in the first state (the light-blocking regions PB1, PB2, PB3, and PB4) can be improved when each light-blocking part BM is provided at a position opposite to, among the first electrodes (for example, the light-transmitting electrodes 14 and 15), an electrode disposed corresponding to the liquid crystal that is in the first state, with the liquid crystal interposed between the light-blocking part BM and the electrode.

A potential transmission system for transmitting a potential to electrodes for causing the liquid crystal to be in the first state can be further simplified when, among the first electrodes (for example, the light-transmitting electrodes 14 and 15), one or more electrodes (for example, the light-transmitting electrode 15) that cause the liquid crystal to be in the first state include an electrode having a greater width in the first direction Dx than that of another electrode (for example, the light-transmitting electrode 14) that causes the liquid crystal to be in the second state. This is because a wiring system for potential transmission can be further simplified in a case in which a potential for causing the liquid crystal to be in the first state is provided to the larger electrode as compared to a case in which the potential is provided to each of a plurality of smaller electrodes disposed in the same area where the larger electrode is disposed.

Forming the first electrodes can be further simplified when, among the first electrodes, one or more electrodes (for example, a light-transmitting electrode 140 illustrated in FIG. 13) that cause the liquid crystal to be in the first state include an electrode having the same width in the first direction Dx as that of another electrode (for example, a light-transmitting electrode 140 illustrated in FIG. 13) that causes the liquid crystal to be in the second state. This is because, when an electrode corresponding to a position to be brought into the first state and another electrode corresponding to a position to be brought into the second state are equal in the width in the first direction Dx, the pixel electrode layer can be designed without considering those electrodes separately from each other.

The first electrodes (for example, the light-transmitting electrodes 14 and 15) extend in a direction along the second panel 10 and intersecting the first direction Dx and the second direction Dy. With this configuration, light from sub pixels 49 (for example, the first sub pixel 49R, the second sub pixel 49G, and the third sub pixel 49B) of a plurality of colors included in the first panel 40 configured to perform color display output can be visually recognized at the viewpoints E1, E2, . . . , En.

Figure 19:
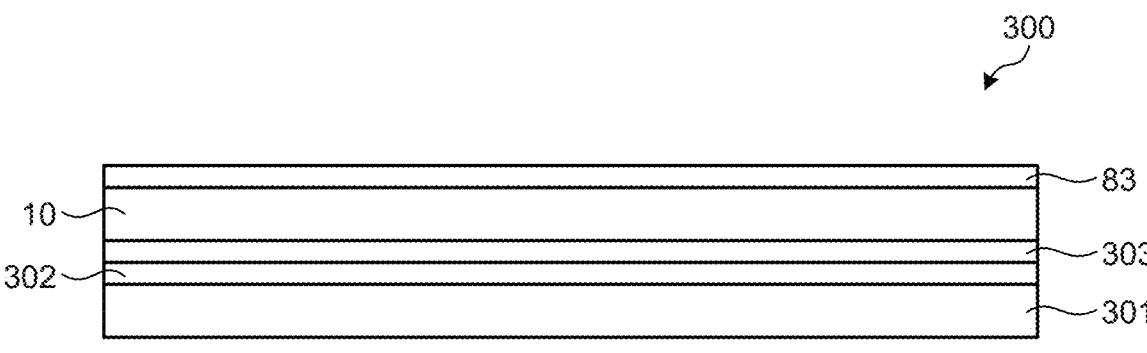
FIG. 19 is a schematic diagram illustrating an exemplary multilayered structure of a display device in which a self-luminous display panel is employed.
Figure 19:
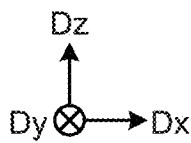

The first panel 40 is not limited to a color liquid crystal display panel and may be a monochrome liquid crystal display panel or an electronic paper display. Alternatively, the first panel 40 may be a self-luminous display panel. The backlight 70 is not needed when the first panel 40 is a self-luminous display panel. The configuration illustrated in FIG. 16 cannot be employed when the first panel 40 is a self-luminous display panel. FIG. 19 is a schematic diagram illustrating an exemplary multilayered structure of a display device 300 for which a self-luminous display panel is employed. The display device 300 includes a display panel 301, a Λ/4 plate 302, a polarization plate 303, the second panel 10, and the third polarization plate 83, which are stacked from one side toward the other side in the third direction Dz. The third polarization plate 83 is positioned on a user side closer to a user who recognizes a stereoscopic view, and the display panel 301 is positioned on a side opposite to the user side. The display panel 301 is, for example, an organic light emitting diode (OLED) panel but not limited thereto and may be a self-luminous display panel of another system. The Λ/4 plate 302 changes the phase of light passing therethrough in the third direction Dz. Specifically, the phase difference of light passing through the Λ/4 plate 302 in the third direction Dz when the light is emitted therefrom is shifted by 90 degrees (°) relative to the phase difference when the light is incident thereon. The polarization plate 303 has the same configuration as that of the second polarization plate 82. The polarization direction of light passing through the polarization plate 303 intersects the polarization direction of light passing through the third polarization plate 83. Specifically, the polarization plate 303 transmits light polarized in the first direction Dx (a polarization component having a polarization axis in the first direction Dx).

It should be understood that the present disclosure provides any other effects achieved by aspects described above in the present embodiment, such as effects that are clear from the description of the present specification or effects that could be thought of by the skilled person in the art as appropriate.

What is claimed is:

1. A liquid crystal display device comprising:
a first panel configured to display an image;
a backlight configured to irradiate the first panel with light from a back surface side of the first panel; and
a second panel configured to limit an emission area of the light, wherein
the second panel includes a plurality of first electrodes and a second electrode provided at a position opposite to the first electrodes with liquid crystal interposed between the first and second electrodes,
the first electrodes are arranged in a first direction,
the first electrodes are provided with such respective potentials that a first state and a second state alternately occur in the first direction, the first and second states being states of the liquid crystal,
the first state is configured to block light,
the second state is configured to transmit light,
a first one of the first electrodes that causes the first state has a first width in the first direction,
a second one of the first electrodes that causes the second state has a second width in the first direction,
the first width is wider than the second width, and
the second state is configured to change refractive index distribution of light incident from the first panel.

2. The liquid crystal display device according to claim 1, wherein the image output from the first panel is visually recognized as a parallax image when the second panel limits the emission area of the light.

3. The liquid crystal display device according to claim 1, wherein the second electrode is formed in one body.

4. The liquid crystal display device according to claim 1, wherein the second electrode overlaps all of the first electrodes.

5. The liquid crystal display device according to claim 1, wherein potentials of the first electrodes are controlled individually.

6. The liquid crystal display device according to claim 1, wherein the first and second electrodes have light-transmitting properties.

7. The liquid crystal display device according to claim 1, wherein, among the first electrodes, an electrode disposed corresponding to the liquid crystal that is in the first state has light-blocking properties.

8. The liquid crystal display device according to claim 1, wherein a light-blocking part is provided at a position opposite to, among the first electrodes, an electrode disposed corresponding to the liquid crystal that is in the first state, with the liquid crystal interposed between the light-blocking part and the electrode.

9. The liquid crystal display device according to claim 1, wherein
the first electrodes extend in a direction parallel to the main surface and intersecting the first direction and a second direction, and
the second direction is a direction parallel to the main surface and orthogonal to the first direction.

10. The liquid crystal display device according to claim 1, wherein
a first polarization plate is provided between the backlight and the first panel,
a second polarization plate is provided between the first and second panels,
a third polarization plate is provided on the second panel, and
the polarization axes of the first polarization plate and the third polarization plate are parallel to each other and intersect the polarization axis of the second polarization plate.

11. The liquid crystal display device according to claim 1, wherein
third ones of the first electrodes causes the second state, and
the first width is wider than a width of each of the third ones.

12. The liquid crystal display device according to claim 1, wherein
third ones of the first electrodes cause the second state,
fourth ones of the first electrodes cause the first state, each of the fourth ones has the first width, and
the first width is wider than a width of each of the third ones.

13. The liquid crystal display device according to claim 1, wherein
third ones of the first electrodes cause the second state,
fourth ones of the first electrodes cause the first state, each of the fourth ones has the first width, and
a first pair of the fourth ones, some of the third ones, and a second pair of the fourth ones are arranged in the first direction in the order as listed, none of the first electrodes being disposed between the first pair and the second pair.

14. A liquid crystal display device comprising:
a first panel configured to display an image;
a backlight configured to irradiate the first panel with light from a back surface side of the first panel; and
a second panel configured to limit an emission area of the light, wherein
the second panel includes a plurality of first electrodes and a second electrode provided at a position opposite to the first electrodes with liquid crystal interposed between the first and second electrodes,
the first electrodes are arranged in a first direction, the first electrodes are provided with such respective potentials that a first state and a second state alternately occur in the first direction, the first and second states being states of the liquid crystal, the first state is configured to block light, the second state is configured to transmit light, a first one of the first electrodes that causes the first state has a first width in the first direction, a second one of the first electrodes that causes the second state has a second width in the first direction, the first width is wider than the second width, third ones of the first electrodes cause the second state, fourth ones of the first electrodes cause the first state, each of the fourth ones has the first width, and a first pair of the fourth ones, some of the third ones, and a second pair of the fourth ones are arranged in the first direction in the order as listed, none of the first electrodes being disposed between the first pair and the second pair.

* * * * *